Patented Feb. 14, 1950

2,497,673

UNITED STATES PATENT OFFICE 2,497,673

REACTION OF ALPHA-BETA UNSATURATED COMPOUNDS WITH AROMATIC HYDROCARBONS AND PRODUCTS OBTAINED

William Kirk, Jr., Wilmington, Del., assignor to E. I. du Pont de Nemours & Company, Wilmington, Del., a corporation of Delaware No Drawing. Application April 16, 1946, Serial No. 662,613

8 Claims. (Cl. 260—515)

This invention relates to new organic compounds, and more particularly to compounds of this kind useful as intermediates for the manufacture of condensation polymers.

This invention has as an object a new class of compounds which are valuable intermediates for the preparation of nylon. Further objects reside in methods for making these compounds. Other objects will appear hereinafter.

The compounds of this invention are of the general formula

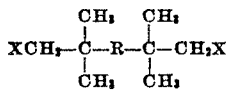

in which R is an aromatic hydrocarbon radical, and X is a substituent selected from the group consisting of —COCH$_3$, —COOH, —COOCH$_3$, —CN, —CHNH$_2$CH$_3$, and —CH$_2$NH$_2$.

The above compounds are prepared by reacting in the presence of a Friedel-Crafts catalyst an alpha, beta-unsaturated carbonyl compound with an aromatic hydrocarbon compound having at least 6 nuclear hydrogen atoms. More particularly these alpha, beta-unsaturated carbonyl compounds are of the type (CH$_3$)$_2$C=CHY wherein Y is

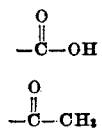

or —C≡N. These carbonyl compounds are preferably of the type (CH$_3$)$_2$C=CH—COY wherein Y is —OH or —CH$_3$, and yield polyamide intermediates of the formula described above wherein X is COCH$_3$, or COOH. When X is CH(CH$_3$)NH$_2$ or CH$_2$NH$_2$ the intermediate is prepared by reduction of the —COCH$_3$ group in the presence of ammonia, (or by the reduction of the dioxime), or by the conversion of the —COOH group to the nitrile followed by hydrogenation using conventional methods.

The aromatic hydrocarbon compound, which is usually one yielding the phenylene, naphthalene, biphenylene or 1,2-diphenyleneethane radical, is reacted with the carbonyl compound at a temperature of from 0° C. to 100° C., and preferably from 20° to 70° C., in the proportion of at least two mols of the carbonyl compound per mol of the hydrocarbon in the presence of a Friedel-Crafts catalyst. Examples of compounds which are obtained by the practice of this invention and which are particularly valuable as nylon intermediates are the following:

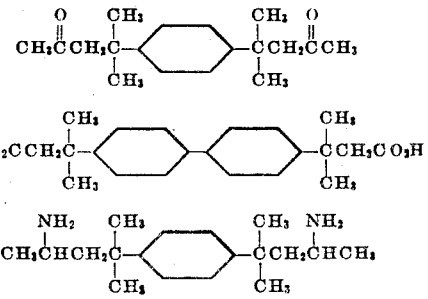

The first of the above compounds is prepared from benzene and mesityl oxide; the second by reaction of beta, beta-dimethylacrylic acid with biphenyl; and the third by reductive amination of the first mentioned compound.

The preferred method for obtaining the new bifunctional intermediates described herein involves charging the reaction vessel with the aromatic hydrocarbon, inert solvent and catalyst and adding a solution of beta, beta-dimethylacrylic acid or mesityl oxide in an inert solvent at a temperature of 25° to 40° C. The reaction is completed by stirring for a period of from 1 to 3 hours after the addition of the acid or ketone. The product is isolated by pouring the reaction mixture into cold water and separating off the water insoluble portion. Purification is carried out by recrystallization and/or distillation as required.

The following examples illustrate the invention in greater detail. The parts are by weight.

Example I

A mixture of 720 parts of anhydrous aluminum chloride, 900 parts of n-hexane and 156.0 parts of dry benzene was prepared and treated with 400 parts of anhydrous mesityl oxide. The addition was carried out over a period of 0.75 hour maintaining the temperature at 30° C. Stirring was continued after the addition of the mesityl oxide was complete for one-half hour at the end of which time the reaction mass had completely solidified under the hexane solvent. The hexane was decanted from the solid mass and the residue hydrolized by addition to 1000 parts of ice-water. The oily top layer which was formed was drained off and the aqueous solution remaining extracted with 200 parts of ether. This ether solution was added to the oily layer and the combination washed with water, 10% sodium carbonate and finally with water. After drying over calcium chloride the solution was distilled and there was obtained 355 parts boiling at 172–177° C./2.8 mm. The latter fraction was a rather viscous yellow oil. It was purified by recrystallization from 500 parts of petroleum ether to give 297 parts of 4,4'-phenylene bis-(4-methyl-2-pentanone) in the form of colorless crystals melting at 34–35.5° C.

*Example II*

A mixture of 80 parts of anhydrous aluminum chloride, 250 parts of carbon disulfide and 23.1 part of biphenyl was treated with a solution of 30.0 parts of B, B'-dimethylacrylic acid in 125 parts of carbon disulfide. The addition was carried out over a period of 0.25 hour at 25–30° C. There was little heat effect but some hydrogen chloride was evolved. The reaction mixture was stirred for an additional two hours at 25° C. and then at 45° C. for one hour, at the end of which time the evolution of hydrogen chloride had stopped. The reaction mass was hydrolyzed by pouring into 1000 parts of ice to precipitate a white, curdy mass which was filtered off, washed with ether to remove carbon disulfide and pressed dry. This filter cake was placed in a solution of 200 parts of ammonium hydroxide (28%) in 200 parts of water, warmed on a steam bath and filtered. This removed small amounts of alkali insoluble material, presumably aluminum hydroxide. Acidification of the filtrate threw down a precipitate which was filtered off and dried. The yield of B,B,B',B'-tetramethyl-4,4'-biphenyl dipropionic acid was 28.5 parts. Purification was carried out by recrystallization from ethyl alcohol to give a product melting at 234–236.5° C. Anal.: Calc'd for $C_{22}H_{26}O_4$: N. E.=177.2. Found N. E.=177.2, 177.0.

*Example III*

The dioxime of 4,4'-phenylene bis(4-methyl-2-pentanone) was prepared by conventional methods and had a melting point of 163–164° C. The hydrogenation of this dioxime to 3,3'-phenylene bis(1-methylisoamylamine) was carried out on 76 parts of the dioxime and 150 parts of ethyl alcohol over 10 parts of Raney nickel at 1000–1500 p. s. i. of hydrogen. The catalyst was filtered off on a mat of charcoal (Darco) to give a water white filtrate. After removing the alcohol under reduced pressure, the residue was distilled to give 29 parts of the desired diamine boiling at 158–160° C./0.7 mm. Further purification was obtained by a second distillation through a precision still taking only that portion which boiled at 135° C./0.6 mm. Anal.: Calc'd for $C_{18}H_{32}N_2$: N. E.=138.2. Found N. E.=138.4.

Examples of alpha, beta-unsaturated carbonyl compounds other than those described above which can be used in the practice of this invention are $(CH_3)_2C=CHCN$ and $(CH_3)_2=CHCO_2CH_3$ Suitable aromatic hydrocarbon compounds in addition to those previously mentioned include

and

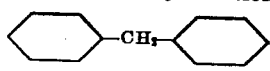

i. e., diphenylmethane, and 1,2-diphenylethane (or bibenzyl).

Although the preferred catalysts are polyvalent Friedel-Crafts catalysts of the kind used in the examples, other Friedel-Crafts catalysts, for example, aluminum bromide and ferric chloride can be used.

Bifunctional intermediates of the type previously described are particularly useful in the preparation of condensation polymers, especially polyamides. The peculiar structure of these intermediates confers properties on the polyamides especially desirable for their use as waterproof coating compositions for fabrics, metals and miscellaneous materials and as durable films and foils. Polyamides can be obtained from these intermediates which are exceptionally soluble in organic solvents such as methyl or ethyl alcohol while being resistant to attack by water. Such polyamides not only form concentrated solutions in alcohol, but also solutions of excellent stability at room temperature. While other polyamides are known which are quite soluble in organic solvents, those possessing the degree of solubility of the polyamides obtained from the present intermediates are quite water sensitive. For example, the polyamide from triglycol diamine and adipic acid is quite soluble in alcohol but is also water soluble. The good solubility and solution stability of the polyamides from these branched chain intermediates make possible their use in conjunction with other compounds in the preparation of complex homogeneous mixtures. For example, the polyamide obtained from 3,3'-p-phenylene bis(1-methylisoamylamine) (the preparation of which is described in Example III) and sebacic acid is soluble at least 20% in ethyl alcohol and can be incorporated in a nitrocellulose solution along with other ingredients to produce a stable homogeneous mixture. The new compounds described herein are also useful intermediates for the preparation of compounds for various pharmaceutical purposes such as medicinals, bactericides, insecticides, preservatives, etc.

As many apparently widely different embodiments of this invention may be made without departing from the spirit and scope thereof, it is to be understood that I do not limit myself to the specific embodiments thereof except as defined in the appended claims.

I claim:

1. A compound having the general formula

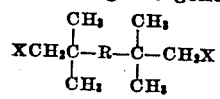

in which R is an aromatic hydrocarbon diradical, and X is a substituent selected from the group consisting of —$COCH_3$, —COOH, and —CN, said diradical being selected from the group consisting of phenylene, naphthalene, biphenylene, diphenylenemethane, and 1,2-diphenyleneethane.

2. A compound having the general formula set forth in claim 1 in which X is —$COCH_3$.

3. A compound having the general formula set forth in claim 1 in which X is —COOH.

4. A compound having the formula

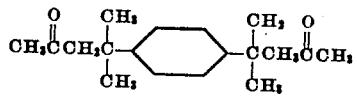

5. A compound having the formula

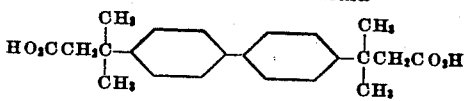

6. A process which comprises reacting in contact with a Friedel-Crafts catalyst at a temperature of from 20° C. to 70° C. for a period of from 1 to 3 hours one mol of an aromatic compound having at least 6 nuclear hydrogens with at least two mols of an alpha, beta-unsaturated compound of the formula $(CH_3)_2C=CHY$, in which Y is selected from the group consisting of

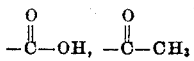

and $-C\equiv N$.

7. The process set forth in claim 6 in which Y is

8. A process which comprises reacting in contact with a Friedel-Crafts catalyst at a temperature of from 20° C. to 70° C. for a period of from 1 to 3 hours one molecule of benzene with at least two molecules of mesityl oxide.

WILLIAM KIRK, Jr.

REFERENCES CITED

The following references are of record in the file of this patent:

UNITED STATES PATENTS

| Number | Name | Date |
|---|---|---|
| 1,702,002 | Greune | Feb. 12, 1929 |
| 1,721,560 | Kalischer et al. | July 23, 1929 |
| 2,071,496 | Bruson | Feb. 23, 1937 |
| 2,280,058 | Bruson | Apr. 21, 1942 |
| 2,320,029 | Bruson | May 25, 1943 |
| 2,326,222 | Hopff et al. | Aug. 10, 1943 |
| 2,339,218 | Bruson | Jan. 11, 1944 |

FOREIGN PATENTS

| Number | Country | Date |
|---|---|---|
| 273,321 | Great Britain | Sept. 24, 1928 |
| 288,441 | Great Britain | Apr. 12, 1928 |
| 303,389 | Great Britain | Jan. 1, 1924 |
| 539,832 | Germany | Dec. 2, 1931 |
| 623,338 | Germany | Dec. 21, 1935 |
| 639,359 | France | Mar. 6, 1928 |

OTHER REFERENCES

Hoffman: J. Am. Chem. Soc., vol. 51, pages 2542-2547 (1929).

Ser. No. 397,741, Schlack (A. P. C.), published April 20, 1943.